United States Patent [19]
Miller et al.

[11] Patent Number: 5,740,386
[45] Date of Patent: Apr. 14, 1998

[54] ADAPTIVE EXPANSION BUS

[75] Inventors: Kevin L. Miller; Victor K. Pecone, both of Austin, Tex.

[73] Assignee: Dell USA, L.P., Round Rock, Tex.

[21] Appl. No.: 449,501

[22] Filed: May 24, 1995

[51] Int. Cl.$^6$ .................................................. G06F 13/00
[52] U.S. Cl. ............................................ 395/308; 395/309
[58] Field of Search ................................. 395/308, 306, 395/311, 309, 307; 326/30

[56] References Cited

U.S. PATENT DOCUMENTS

| | | | |
|---|---|---|---|
| 4,922,409 | 5/1990 | Schoellkopf et al. | 395/307 |
| 5,237,695 | 8/1993 | Skokan et al. | 395/200.06 |
| 5,313,595 | 5/1994 | Lewis et al. | 395/306 |
| 5,430,849 | 7/1995 | Banks | 395/308 |
| 5,434,983 | 7/1995 | Yaso et al. | 395/308 X |
| 5,455,916 | 10/1995 | Bourke et al. | 395/285 |
| 5,467,453 | 11/1995 | Kocis | 395/281 |
| 5,473,264 | 12/1995 | Mader et al. | 326/60 |
| 5,481,679 | 1/1996 | Higaki et al. | 395/308 |
| 5,483,642 | 1/1996 | Okazawa et al. | 395/306 |
| 5,495,584 | 2/1996 | Holman, Jr. et al. | 395/308 |
| 5,528,765 | 6/1996 | Milligan | 395/287 |
| 5,548,730 | 8/1996 | Young et al. | 395/280 |

OTHER PUBLICATIONS

Tooley, Michael. *Computer Engineer's Pocket Book.* Butterworth–Heinemann, p. 119, 1996 (first pub. 1987).

Quality Semiconductor, Inc., MDSL–00044–01, High–Speed CMOS QuickSwitch® Products Databook, Quad 2:1 Mux / Demux, ©1995, pp. 2–23 through 2–27.

*Primary Examiner*—Glenn A. Auve
*Attorney, Agent, or Firm*—Skjerven, Morrill, MacPherson, Franklin & Friel; Stephen A. Terrile

[57] ABSTRACT

A bus system is disclosed which includes first and second buses are coupled via an bus switch. The bus switch may be selectively turned on and off thus allowing the bus system to be electronically configured in a plurality of different configurations.

22 Claims, 4 Drawing Sheets

ADAPTIVE EXPANSION BUS

BACKGROUND OF THE INVENTION

The present invention relates to computer systems, and more particularly to bus systems for use with computer systems such as personal computer systems.

Personal computer systems in general and IBM compatible personal computer systems in particular have attained widespread use for providing computer power to may segments of today's modern society. A personal computer system can usually be defined as a desk top, floor standing, or portable microcomputer that includes a system unit having a system processor and associated volatile and non-volatile memory, a display monitor, a keyboard, one or more diskette drives, a fixed disk storage device and an optional printer. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

It is known to provide computer systems with bus systems to allow access to input/output (I/O) devices such as fixed disk drives. Often, in server applications where a large amount of storage is required, the fixed disk drives may be arranged as an array of storage devices. Generally, the array of storage devices is coupled via a bus system which conforms to either the small computer system interface (SCSI) bus standard or the integrated drive electronics (IDE) bus standard. The bus system may be present within the enclosure of the computer system or remotely as a peripheral system. In some instances, multiple computer systems, i.e., hosts, may use the same array of storage devices. In this instance, the array would be configured to provide multiple bus structures which are coupled to respective storage devices. In other instances, a single computer system may access a large number of storage devices. In this instance, the bus system is configured to couple the buses and thus the storage devices on the buses via, e.g., a bus plug jumper. The PowerEdge XE™ computer system available from Dell Computer, Inc. is an example of a system which allows configuration as either a multibus system or a single bus system.

SUMMARY OF THE INVENTION

It has been discovered that providing a bus system with first and second buses which are coupled via a bus switch circuit advantageously allows a bus system which may be electronically configured in a plurality of different configurations.

More specifically, in a preferred embodiment, the invention relates to a bus system which includes a first bus circuit, a second bus circuit and a switch coupled between the first bus circuit and the second bus circuit. The first bus circuit includes a first bus, a first bus connector coupled to the first bus and a first input/output connector coupled to the first bus. The second bus circuit includes a second bus, a second bus connector coupled to the second bus and a second input/output connector coupled to the second bus. When the switch circuit is active the first bus and the second bus are electrically coupled and when the switch circuit is inactive the first bus and the second bus are electrically decoupled.

Additionally, in preferred embodiments, the first bus circuit includes a first terminator and a second terminator. The first terminator is coupled to the first bus physically opposite the first bus connector. The first terminator is active when the switch circuit is inactive. The second terminator is coupled to the second bus physically opposite the second bus connector.

Additionally, in preferred embodiments, the bus system further includes a bus system controller circuit. The bus system controller circuit controls addressing of the first and second input/output connectors based upon whether the switch circuit is active or inactive.

DETAILED DESCRIPTION

The following sets forth a detailed description of the best contemplated mode for carrying out the invention. The description is intended to be illustrative of the invention and should not be taken to be limiting.

Figure 1:
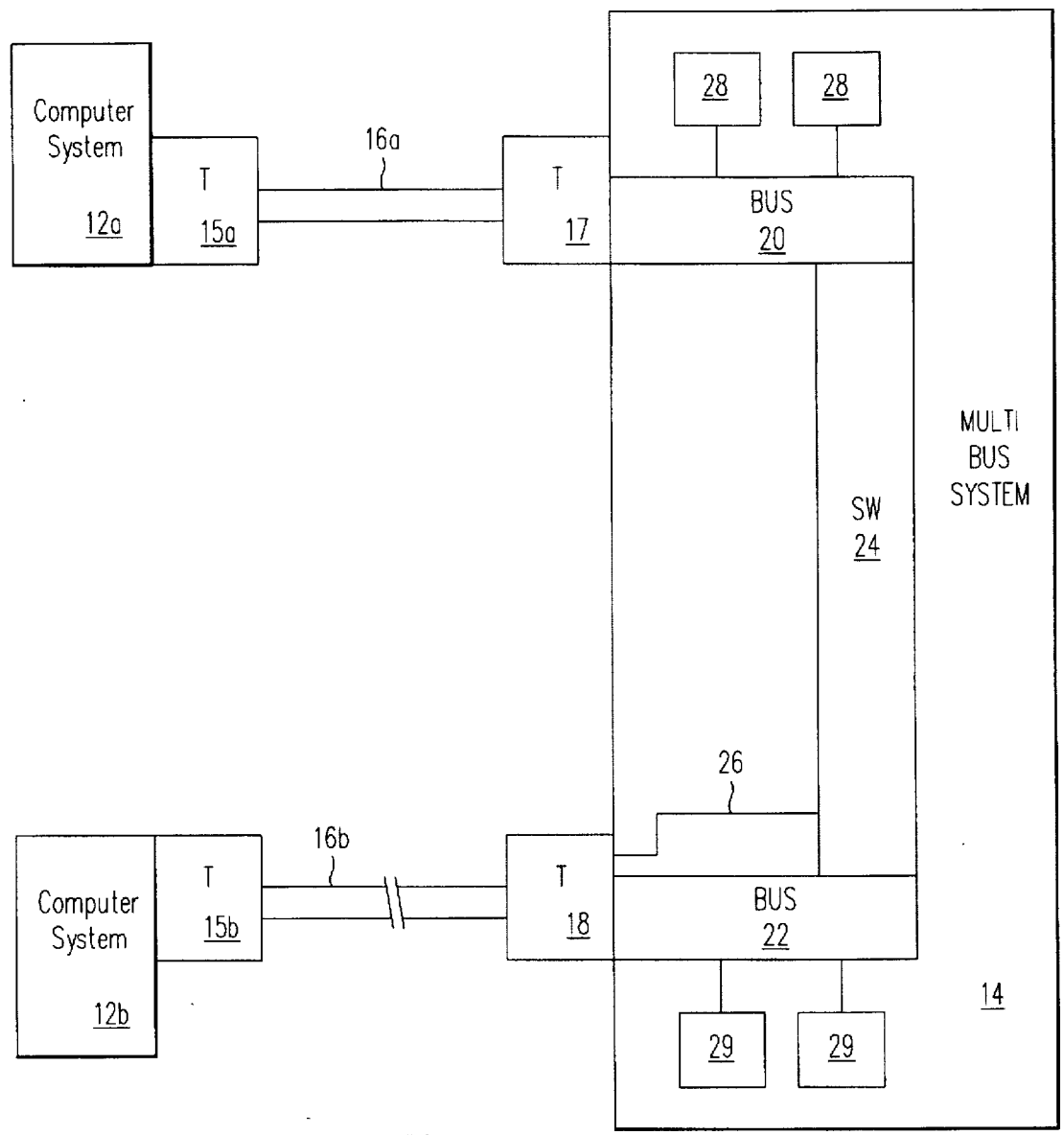
FIG. 1 shows a block diagram of a system which includes a multibus circuit in accordance with the present invention.

Referring to FIG. 1, multicomputer system 10 includes computer systems 12a, 12b and multibus system 14. Computer systems 12a, 12b each include bus terminals 15a, 15b to which cables 16a, 16b are respectively coupled.

Multibus system 14 includes bus connection terminals 17, 18 which are coupled to buses 20, 22, respectively. Terminals 17, 18 are coupled to cables 16a, 16b, thus coupling computer systems 12a, 12b to multibus circuit 14. Buses 20, 22 are coupled via switch circuit 24. Switch circuit 24 is also coupled to terminal 18 via select signal connection 26. Switch circuit 24 is controlled by a select signal which is provided via select signal connection 26. Bus 20 includes terminals for coupling to a plurality of input/output devices 28. Bus 22 includes terminals for coupling to a plurality of I/O devices 29.

In operation, if computer system 12b is not coupled to multibus system 14, then switch circuit 24 couples bus 20 to bus 22, thus configuring multibus system 14 in a single bus configuration. Thus, computer system 12a may access I/O devices 28 and I/O devices 29. If computer system 12b is coupled to multibus system 14, then switch circuit 24 decouples bus 20 from bus 22, thus configuring multibus system 14 in a dual bus configuration. In the dual bus configuration, the multibus system 14 includes two distinct buses to which computer systems 12a, 12b are respectively coupled. Accordingly, computer system 12a may access I/O devices 28 but not I/O devices 29 and computer system 12b may access I/O devices 29, but not I/O devices 28.

Figure 2:
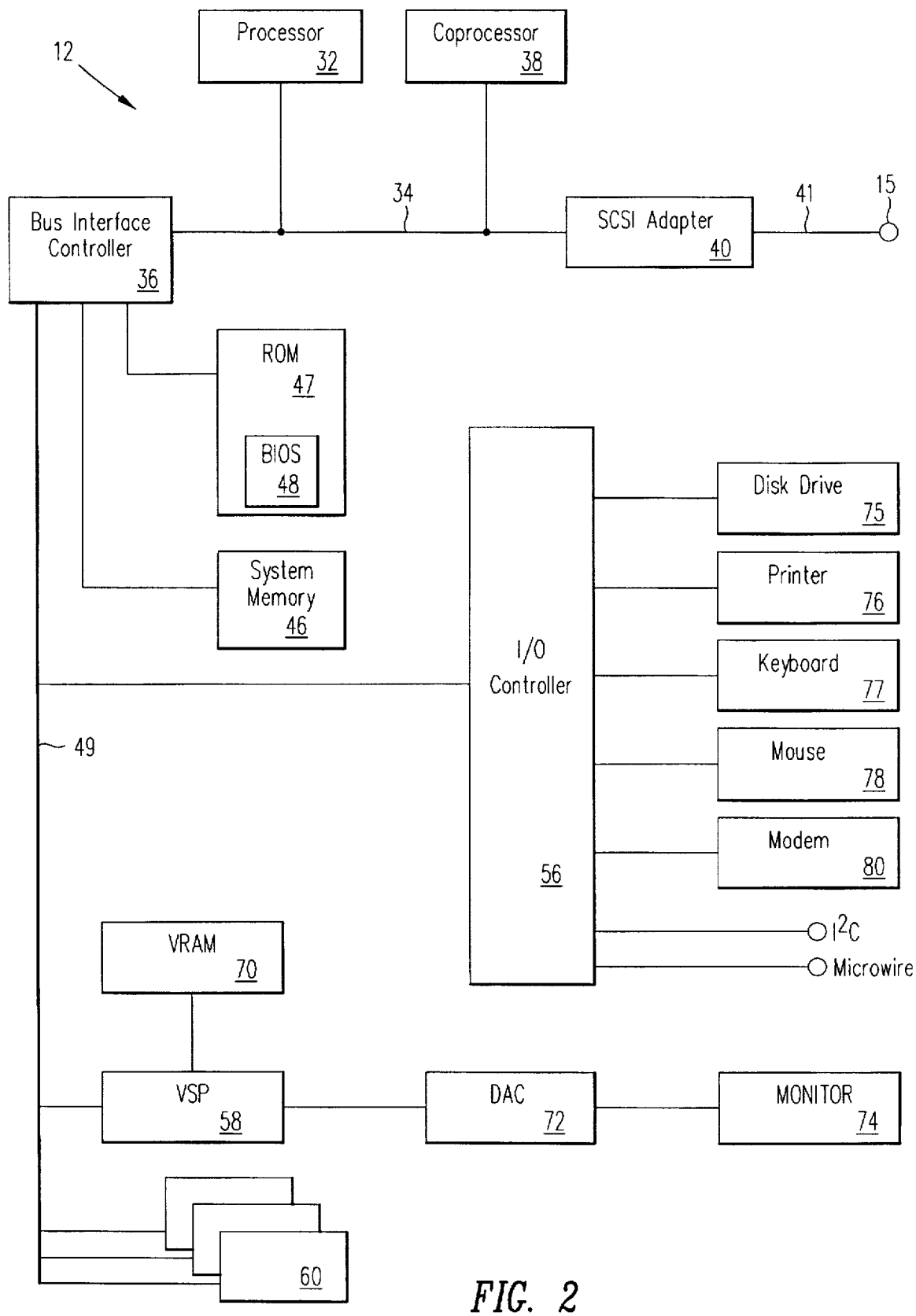
FIG. 2 shows a schematic block diagram of a computer system which is used in the FIG. 1 multibus system.

Referring to FIG. 2, an example of computer systems 12a and 12b is shown as computer system 12. Computer system 12 includes system processor 32, coupled to local bus 34 which, in turn, is coupled to bus interface controller 36, coprocessor 38, small computer system interface (SCSI) adapter 40. Processor 32 is preferably a microprocessor from the family of x86 processors, such as a 486 or Pentium™ microprocessor. Local bus 34 includes conventional data, address and control lines conforming to the architecture of the processor. SCSI adapter 40 couples local bus 34 to SCSI bus 41 which is coupled to connection terminal 15 via which SCSI devices such as a SCSI hard drive may be coupled to SCSI adapter 40.

Bus interface controller 36 performs two primary functions. The first function that bus interface controller 36 performs is as a memory controller for accessing main system memory 46 and nonvolatile memory 47. Main system memory 46 is a dynamic random access memory (RAM) which includes one or more single, in-line memory modules (SIMMS) and stores programs and data for execution by system processor 32 and coprocessor 38. Nonvolatile memory 47 is, e.g., a read only memory (ROM) which stores microcode including basic input output system (BIOS) 48 of computer system 12.

BIOS 48 is a microcode software interface between an operating system or application programs and the hardware of system 12. The operating system and application programs access BIOS 48 rather than directly manipulating I/O ports and control words of the specific hardware. BIOS 48 is accessed through an interface of software interrupts and contains a plurality of entry points corresponding to the different interrupts. In operation, BIOS 48 is loaded from ROM 47 to system memory 46 and is executed from system memory 46.

The second function that bus interface controller 36 performs is as an interface between bus 34 and input/output (I/O) bus 49. I/O bus 49 conforms to the industry standard architecture (ISA) standard, which is also sometimes referred to as the AT bus standard. Bus 49 is further coupled to I/O controller 56, video signal processor 58 and a plurality of I/O slots 60, into which a variety of I/O or expansion cards (not shown) may be inserted.

Video signal processor 58 is further coupled to video RAM (VRAM) 70 and to digital to analog converter (DAC) 72. Digital to analog converter 72 is coupled to monitor 74, which is a conventional computer display device conforming to, e.g., the super video graphics array (SVGA) standard. Alternatively, video signal processor 58 may be coupled to local bus 34.

I/O controller 56 is coupled to and controls the operation of disk drive 75, printer 76, keyboard 77, and mouse 78. I/O controller 46 also includes a modem port to which a modem 80 may be optionally connected, inter-integrated circuit (I²C) port 83 to which an I²C device may optionally be connected and microwire port 84 to which a microwire device may optionally be connected.

Figure 3:
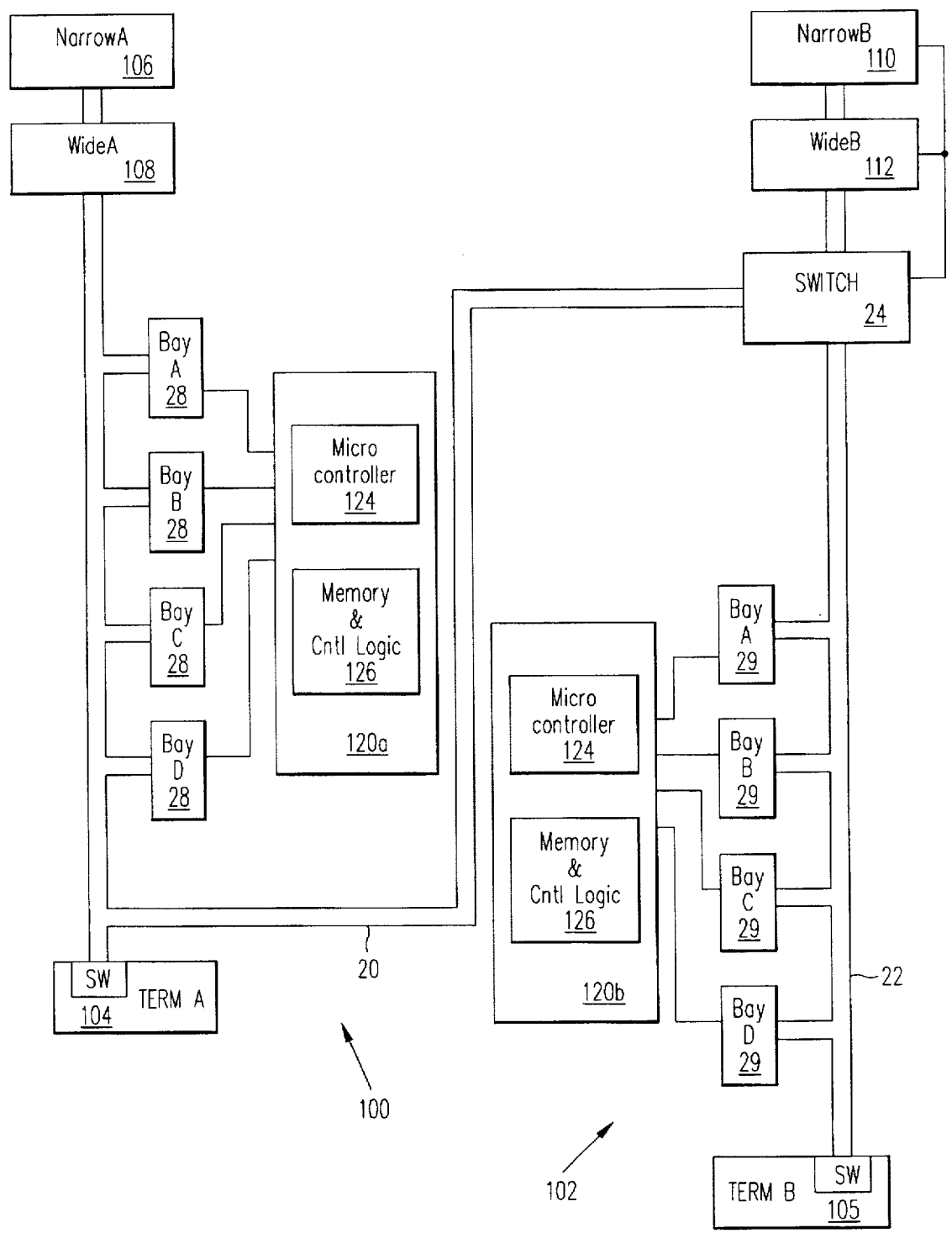
FIG. 3 shows a block diagram of the FIG. 1 multibus system.

Referring to FIG. 3, multibus system 14 includes bus A circuit 100, bus B circuit 102 and switch circuit 24. Bus A circuit includes bus 20; bus B circuit includes bus 22. Buses 20, 22 are physically and electrically separate buses which conform to the SCSI bus architecture. Buses 20, 22 are each coupled to switch circuit 24.

Bus A circuit 100 includes four input/output (I/O) connectors 28 (Bay A, Bay B, Bay C, Bay D) which are coupled to bus 20. Bus B circuit 102 includes four I/O connectors 29 (Bay A, Bay B, Bay C, Bay D) which are coupled to bus 22. I/O devices such as disk drives may be independently connected to each connector 28, 29.

Bus A circuit 100 includes active termination device 104 (TERM A). Termination device 104 is located at the physical end of bus A 20, i.e., termination device 104 is opposite of the connection to computer 12 from I/O connectors 28. Bus B circuit 102 includes active termination device 105 (TERM B). Termination device 105 is located at the physical end of bus B 22, which is also the physical end of the combination of buses 20, 22. I.e., termination device 105 is opposite the connection to computer 12 from I/O connectors 29. Termination devices 104, 105 are available, for example, under the trade designation 5603 Active Terminator from Unitrode, Inc., located in Merrimack, N.H.

Bus A circuit 100 includes two bus connectors 106, 108 (NARROWA, WIDEA) which are coupled to bus 20 and which conform to the narrow and wide SCSI bus standards, respectively. Bus B circuit 102 includes two bus connectors 110, 112 (NARROWB, WIDEB) which are coupled to bus 22 via switch 24 and which conform to the narrow and wide SCSI bus standards, respectively. When multibus circuit 14 is configured in its dual bus configuration (i.e., in a 2×4 configuration buses 20, 22 may be simultaneously and independently active. Buses 20, 22 are controlled by respective SCSI controllers 40 which are contained within the computer systems 12 which are coupled to the respective bus.

Each bus circuit 100, 102 within multibus system 14 includes a respective bus circuit controller 120 which in combination provide a bus system controller circuit. Each bus circuit controller 120 includes microcontroller 124, which is, e.g., an 80c552 microcontroller, and memory and control logic 126, which stores the information used by microcontroller 120. Providing separate bus circuit controllers 120 enables each bus circuit 100, 102 within multibus system 14 to function independently.

Each bus circuit controller 120 performs a plurality of functions. More specifically, each bus circuit controller 120 provides assignment of device addressing based upon the bus system topology configured (i.e., whether switch 24 is active to provide a single bus or inactive to provide two separate buses). Additionally, each bus circuit controller 120 provides for the automatic configuration of SCSI hard drives which are installed within multibus circuit 14 upon system initiation or system reset. Each bus circuit controller 120 provides for the sequenced application of drive power during system initiation or reset to reduce the load on the power supply (not shown) which drives multibus circuit 14. Each bus circuit controller 120 provides a drive failure detection function. Each bus circuit controller 120 provides local SCSI hard disk drive control.

Switch 24 is a low impedance bi-directional analog switch device fabricated with metal oxide semiconductor (MOS) technology which is available under the trade designation QuickSwitch from, e.g., Quality Semiconductor, Inc. Switch is, e.g., a 2 to 1 multiplexer in which the bus A 20 signal paths provide the first input and the signals from the bus B connectors 110, 112 provide the second input. The output of switch 24 is coupled to bus B 22.

In operation, multibus system 14 can be configured in a single bus configuration which supports up to seven SCSI hard drives (the 1×8 configuration). The single bus configuration is achieved by activating switch circuit 24. In the single bus configuration, if the bus conforms to the narrow SCSI bus standard, the eighth bay is disabled because the narrow SCSI bus architecture standard only supports up to seven devices. If the bus conforms to the wide SCSI bus standard, then all eight bays are coupled together. The wide SCSI bus standard supports up to 15 bays coupled to a single SCSI bus.

When multibus system 14 is configured in a dual bus configuration (e.g., in a 2×4 SCSI bus matrix), active bus termination devices, TERM A and TERM B, are enabled and thus are active. If multibus system 14 is configured as a 1×8 SCSI bus, termination device TERM A 104 is disabled and thus inactive, while bus termination device TERM B 105 remains active and functions as the terminator for the entire bus. Thus, multibus system 14 controls the configuration of the termination devices so that each distinct bus includes a termination device at the physical end of the bus.

In either the 2×4 or 1×8 configuration, each bus circuit controller 120 controls the functions of the up to four drives to which the respective bus circuit controller 120 is connected. I.e., bus circuit controller 120a controls drives on bus A, bays A through D and bus circuit controller 120b controls drives on Bus B, bays A through D.

OTHER EMBODIMENTS

Other embodiments are within the following claims.

Figure 4:
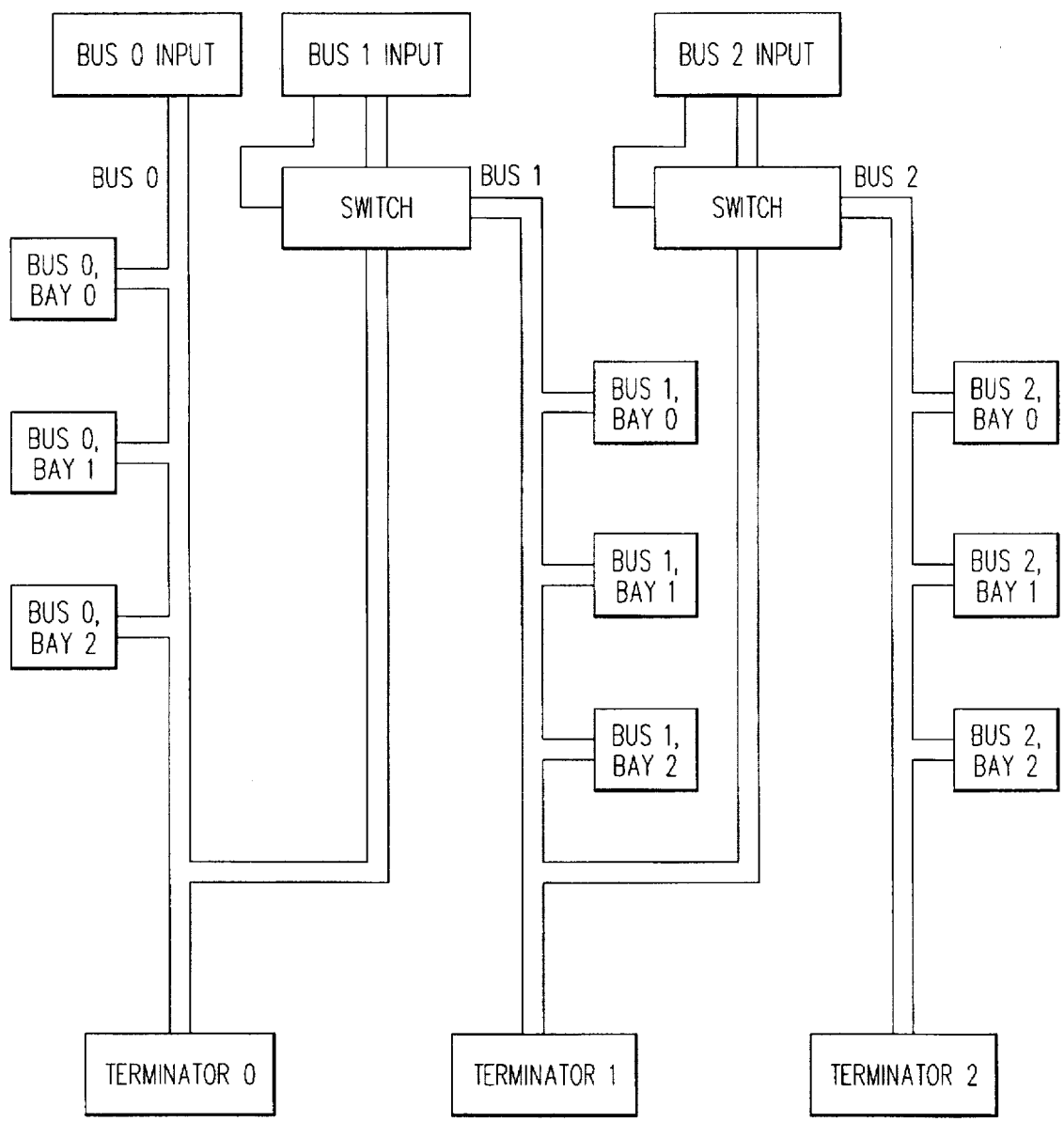
FIG. 4 shows a block diagram of an alternate multibus system in accordance with the present invention.

For example, while the preferred embodiment is shown having the choice of a 1×8 or two 2×4 configurations, any combination of bus configurations may be provided using the present invention. For example, referring to FIG. 4, a multibus system may provide the option of having a one, two or three bus configuration. In this system, each bus includes a respective active terminator which is also selectively added or removed from the circuit depending upon the bus configuration that is chosen.

Any combination of buses is contemplated. For example the FIG. 4 multibus could be configured to allow different combinations of buses, e.g., 1×6 plus 1×3, in addition to all of the buses being separate or coupled together. Different combinations of buses may be limited by physical addresses limitations. E.g., with the SCSI bus architecture, the narrow SCSI bus standard provides for up to seven identification addresses, the wide SCSI bus standard provides for up to fifteen identification addresses. Alternately, different combinations of buses may be limited by signal degradation and attenuation of each switch within the bus system.

Also for example, while the preferred embodiment shows active terminators at the physical ends of both buses, the system could be configured so that only the terminators of intermediate buses (e.g., bus A in FIG. 3) are active, while the terminator which is located at the physical end of the system is not active.

Also for example, while the preferred embodiment shows each bus including a respective terminator, the system could also be configured with a system terminator at the physical end of the bus system along with a terminator for each respective individual bus.

What is claimed is:

1. A bus system comprising:

a first bus, the first bus conforming to a bus standard;

a second bus, the second bus being physically and electrically separate from the first bus, the second bus conforming to the bus standard;

a switch coupled to the first bus and second bus, the switch being electrically controllable for selectively connecting the first bus and the second bus to provide a single bus;

a first terminator, the first terminator being coupled to the first bus physically adjacent the switch, the first terminator being active when the switch circuit is inactive; and a second terminator, the second terminator being coupled to the second bus physically opposite the switch.

2. The bus system of claim 1 further comprising a first input/output connector coupled to the first bus, and a second input/output connector coupled to the second bus.

3. The bus system of claim 1 further comprising a first bus connector coupled to the first bus, and a second bus connector coupled to the second bus.

4. The bus system of claim 1 wherein:

the first and second buses conform to the small computer system interface bus standard.

5. A bus system comprising:

a first bus circuit, the first bus circuit including a first bus, a first bus connector coupled to the first bus and a first input/output connector coupled to the first bus, the first bus conforming to a bus standard, the first bus circuit also including a first terminator, the first terminator being coupled to the first bus physically opposite the first bus connector, the first terminator being active when the switch circuit is inactive;

a second bus circuit, the second bus circuit including a second bus, a second bus connector coupled to the second bus and a second input/output connector coupled to the second bus, the second bus conforming to the bus standard, the second bus circuit also including a second terminator, the second terminator being coupled to the second bus physically opposite the second bus connector;

a switch circuit coupled to the first bus circuit and the second bus circuit such that when the switch circuit is active the first bus and the second bus are electrically coupled and when the switch circuit is inactive the first bus and the second bus are electrically decoupled, the switch circuit being set active and inactive via a select signal, the select signal being provided by a computer system coupled to the switch circuit.

6. The bus system of claim 5 wherein the first bus circuit includes a plurality of input/output connectors coupled to the first bus.

7. The bus system of claim 5 wherein the second bus circuit includes a plurality of input/output connectors coupled to the second bus.

8. The bus system of claim 5 wherein:

the first and second buses conform to the small computer system interface bus standard.

9. A bus system comprising:

a first bus circuit, the first bus circuit including a first bus, a first bus connector coupled to the first bus and a first input/output connector coupled to the first bus, the first bus conforming to a bus standard;

a second bus circuit, the second bus circuit including a second bus, a second bus connector coupled to the second bus and a second input/output connector coupled to the second bus, the second bus conforming to the bus standard;

a switch circuit coupled to the first bus circuit and the second bus circuit such that when the switch circuit is active the first bus and the second bus are electrically coupled and when the switch circuit is inactive the first bus and the second bus are electrically decoupled, the switch circuit being set active and inactive via a select signal, the select signal being provided by a computer system coupled to the switch circuit;

a bus system controller circuit, the bus system controller circuit controlling addressing of the first and second input/output connectors based upon whether the switch circuit is active or inactive.

10. The bus system of claim 9 wherein the bus system controller circuit includes first and second bus circuit controllers for controlling the first and second bus circuits, respectively.

11. The bus system of claim 9 wherein the first bus circuit includes a plurality of input/output connectors coupled to the first bus.

12. The bus system of claim 9 wherein the second bus circuit includes a plurality of input/output connectors coupled to the second bus.

13. The bus system of claim 9 wherein:

the first and second buses conform to the small computer system interface bus standard.

14. The bus system of claim 9 wherein:

the first and second buses conform to the integrated drive electronics bus standard.

15. A computer system comprising a processor;

a memory coupled to the processor;

a first bus coupled to the processor;

a bus controller coupled to the first bus;

a second bus coupled to the bus controller, the bus controller controlling operation of the second bus; and a bus system coupled to the second bus, the bus system including a first bus system bus circuit, the first bus system bus circuit including a first bus system bus, a first bus system bus connector coupled to the first bus system bus and to the second bus and a first bus system input/output connector coupled to the first bus system bus, the first bus system bus conforming to a bus standard;

a second bus system bus circuit, the second bus system bus circuit including a second bus system bus, a second bus system bus connector coupled to the second bus system bus and a second bus system input/output connector coupled to the second bus system bus, the second bus system bus conforming to the bus standard;

a switch circuit coupled to the first bus system bus circuit and the second bus system bus circuit such that when the switch circuit is active the first bus system bus and the second bus system bus are electrically coupled and when the switch circuit is inactive the first bus system bus and the second bus system bus are electrically decoupled, the switch circuit being set active and inactive via a select signal, the select signal being provided by the processor.

16. The bus system of claim 15 wherein the first bus system bus circuit includes a first bus system terminator, the first bus system terminator being coupled to the first bus system bus physically opposite the first bus system bus connector, the first bus system terminator being active when the switch circuit is inactive; and the second bus system bus circuit includes a second bus system terminator, the second bus system terminator being coupled to the second bus system bus physically opposite the second bus system bus connector.

17. The bus system of claim 15 further comprising a bus system controller circuit, the bus system controller circuit controlling addressing of the first and second bus system input/output connectors based upon whether the switch circuit is active or inactive.

18. The bus system of claim 17 wherein the bus system controller circuit includes first and second bus system bus circuit controllers for controlling the first and second bus system bus circuits, respectively.

19. The bus system of claim 15 wherein the first bus system bus circuit includes a plurality of input/output connectors coupled to the first bus system bus.

20. The bus system of claim 15 wherein the second bus system bus circuit includes a plurality of input/output connectors coupled to the second bus system bus.

21. The bus system of claim 15 wherein the first and second bus system buses conform to the small computer system interface bus standard.

22. The bus system of claim 15 wherein the first and second bus system buses conform to the integrated drive electronics bus standard.

* * * * *

UNITED STATES PATENT AND TRADEMARK OFFICE
CERTIFICATE OF CORRECTION

PATENT NO. : 5,740,386
DATED : April 14, 1998
INVENTOR(S) : Miller, Kevin L, et. al.

It is certified that error appears in the above-identified patent and that said Letters Patent is hereby corrected as shown below:

Col. 1, line 9, delete "may" and replace with --many--.
Col. 5, line 51, add --the-- before "second bus".

Signed and Sealed this

Ninth Day of February, 1999

Attest:

Attesting Officer

*Acting Commissioner of Patents and Trademarks*